(12) United States Patent
Booth

(10) Patent No.: US 9,625,234 B2
(45) Date of Patent: Apr. 18, 2017

(54) VEHICLE GUN STORAGE SAFE WITH FLEXIBLE INTERNAL LOCKING CASE

(71) Applicant: Brian D Booth, Churchville, PA (US)

(72) Inventor: Brian D Booth, Churchville, PA (US)

(73) Assignee: Stackarms, LLC, Churchville, PA (US)

( * ) Notice: Subject to any disclaimer, the term of this patent is extended or adjusted under 35 U.S.C. 154(b) by 0 days.

(21) Appl. No.: 15/092,288

(22) Filed: Apr. 6, 2016

(65) Prior Publication Data

US 2016/0298927 A1  Oct. 13, 2016

Related U.S. Application Data

(60) Provisional application No. 62/143,935, filed on Apr. 7, 2015.

(51) Int. Cl.
*F41C 33/06* (2006.01)
*B60R 11/00* (2006.01)

(52) U.S. Cl.
CPC .............. *F41C 33/06* (2013.01); *B60R 11/00* (2013.01); *B60R 2011/0003* (2013.01); *B60R 2011/0059* (2013.01)

(58) Field of Classification Search
CPC .. F41C 33/06; B60R 11/00; B60R 2011/0003; B60R 2011/0059; A45C 13/18
USPC .......................................................... 70/18
See application file for complete search history.

(56) References Cited

U.S. PATENT DOCUMENTS

| | | | |
|---|---|---|---|
| 2,706,306 A | 5/1955 | Sheetz | |
| 3,326,385 A | 6/1967 | Pinkerton et al. | |
| 3,859,491 A | 1/1975 | Larson | |
| 5,495,969 A | 3/1996 | Cardenas | |
| 5,683,021 A | 11/1997 | Setina | |
| 5,850,796 A | 12/1998 | Cislo | |
| 6,026,662 A * | 2/2000 | Schlipper | A45C 3/001 70/14 |
| 6,443,346 B1 | 9/2002 | Haass | |
| 8,104,313 B2 | 1/2012 | Wolfe | |
| 8,186,188 B1 | 5/2012 | Brown | |
| 8,752,745 B2 | 6/2014 | Bond et al. | |
| 2003/0110818 A1* | 6/2003 | Schlipper | A45C 13/1046 70/18 |

(Continued)

*Primary Examiner* — Corey Skurdal
(74) *Attorney, Agent, or Firm* — Law Offices of Robert F. Zielinski LLC

(57) ABSTRACT

A gun storage safe formed from a flexible fabric having a generally rectangular closeable outer shell, at least one longitudinal cable conduit channel and at least one latitudinal cable conduit channels and a plurality of wire cables of predefined length substantially disposed within said cable conduit channels wherein said longitudinal and latitudinal cables traverse the interior surfaces of the outer shell and further wherein said wire cable ends extend beyond said cable conduit channels; adjustable cable locks in operative contact with each wire cable end; at least one gun case disposed within said outer shell, wherein the wire cables are positioned within said wire conduit channels are drawn down upon and tightened on said gun case to form a wire cage and said each adjustable cable lock engages the opposite end of said wire cables end to securely lock the wire cables in place and further comprising a plurality of voids on a lower surface thereof and a separate cable segment and adjustable lock for securing said safe to a cargo tie down.

18 Claims, 6 Drawing Sheets

(56) References Cited

U.S. PATENT DOCUMENTS

| | | | | |
|---|---|---|---|---|
| 2006/0180619 A1* | 8/2006 | Schlipper | ............... | A45C 3/001 |
| | | | | 224/191 |
| 2011/0214787 A1* | 9/2011 | Schulte | ................. | A45C 13/00 |
| | | | | 150/102 |
| 2011/0233253 A1* | 9/2011 | Worthington | .......... | A45C 13/18 |
| | | | | 224/645 |
| 2011/0278288 A1* | 11/2011 | Fuller | ..................... | F41C 33/06 |
| | | | | 220/6 |
| 2012/0152776 A1* | 6/2012 | Camp | ................. | F41C 33/0263 |
| | | | | 206/317 |
| 2013/0284780 A1 | 10/2013 | Beckwith et al. | | |
| 2014/0090942 A1* | 4/2014 | Schlipper | ............... | A45C 3/001 |
| | | | | 190/125 |
| 2015/0237981 A1* | 8/2015 | Godshaw | ............. | A45C 13/185 |
| | | | | 150/102 |

\* cited by examiner

VEHICLE GUN STORAGE SAFE WITH FLEXIBLE INTERNAL LOCKING CASE

The present patent application claims the benefit of U.S. Provisional Patent Application Ser. No. 62/143,935, filed Apr. 7, 2015, the entirety of which is hereby incorporated by reference.

FIELD OF THE INVENTION

This invention relates to gun storage devices affixed to an interior surface of a motor vehicle and more specifically to multi-component, unobtrusive, gun storage cases having an outer shell housing and an internal locking cage wherein the device is detachably affixed to a surface in which integral securing and mounting mechanisms are concealed from view.

This invention also relates to gun storage lockers which are unobtrusive and provide a rigid, semi rigid or flexible outer shell housing and an internal locking cage wherein the locker can detachably affixed to a surface in which integral securing and mounting mechanisms are concealed from view.

BACKGROUND

A wide variety of gun storage safes and cases are currently available. However, there is no universal solution to fill every role, or to fit every budget. Storage options are intended to perform one or more of the following principal tasks, which they do with varying degrees of effectiveness. These include holding the firearm out of sight; preventing the gun from firing; protecting the gun from physical damage; and acting act as a theft deterrent.

Gun storage devices capable of being carried in and/or used in motor vehicles are known. Gun storage devices, referred collectively herein as gun cases, for storing a gun such as shotgun or rifle. Gun cases of this type currently available on the market are typically weather-resistant and/or weather-proof, and are made from durable hard or soft material. Most gun cases have a padded, shock-absorbing interior to protect the firearm during transportation. Some gun cases even have multi-purpose storage compartments or modules that are attached or integrated to the interior and/or exterior of the case.

Guns and rifles are relatively expensive items and many gun and hunting enthusiasts spend thousands of dollars for handmade and hand crafted shot guns and rifles. Indeed, some handcrafted firearms such as those custom made by Beretta, Krieghoff and Perazzi can cost from $25,000 to $50,000 with some well exceeding $100,000. While the typical gun case might be suitable for generally protecting the gun from physical damage, these cases do little to conceal the nature of the case contents or to deter or protect those contents from theft.

Examples of such gun cases can be found in the patent literature as well as commercial brochures and advertisements for gun cases. In its most rudimentary form, U.S. Pat. No. 2,531,550 to Bradley et al. discloses a commonly used suitcase-like gun case formed from a moldable material, such as a synthetic resin, which has compartments or cavities for the gun parts and for accessories, in which the carrying handle is directly secured to the part of the case in which the gun parts and accessories are supported. The gun case protects the gun parts from moisture and other abrasive or corrosive materials and can conveniently be used to support and protect the gun from coming in contact with the ground. The cavities may include cover plates, felt pads or other securing means to hold the gun within the cavities during transportation. The gun case of the Bradley disclosure is a type of one of the most common commercially available gun cases and had no provisions for securely mounting it to a motor vehicle.

U.S. Pat. No. 2,706,036 to Neal relates to a shock proof gun case especially adapted for guns equipped with telescopic sights or other mechanism easily rendered inoperative if the gun is subjected to severe jars or strains. The case includes an internal compartment surrounded on all sides by a heavy padding of foam rubber or its equivalent, thereby protecting the gun and its accessories from injury or being thrown out of adjustment by the rubber cushion. The rubber cushion is of sufficient thickness that some pressure is required to close the case, thereby causing the gun to be partially imbedded in the cushion when at rest. The gun case is not particularly suited for motor vehicles.

U.S. Pat. No. 3,326,385, to Pinkerton et al., pertains to a vehicle mounted gun rack including various mechanical locking devices for locking guns in a rack for safe keeping therefor and an electrical locking means operatively connected to the vehicle battery. While adapted for motor vehicles, the firearms remain in full view at all times.

U.S. Pat. No. 3,857,491 to Townsend et al. also relates to gun racks of the horizontal type with means provided to lock guns in position against unauthorized removal and discloses a vehicle mounted gun rack having a slidable mechanism thereon for cooperating with the stock portion of a gun to lock the gun in position in said gun rack and a key operated lock for operating the slidable mechanism to lock said gun in position or to enable removal of said gun from said rack. The locking gun rack may offer some measure of security by providing locks for the guns but the guns remain in full view at all times.

U.S. Pat. No. 5,495,969 to Cardenas discloses a portable gun rack adapted to engage the rear of the back seat of a sports vehicle which allows the guns to be supported in such a manner so as to have them oriented scope-side down which is a more stable manner for transport. The rack is secured to the vehicle seat via tie-downs and a decorative over cover for the gun rack is provided to help to disguise the presence of the weaponry and thus to reduce the incidence of theft. The gun rack disclosed offers little by way of effective security for the guns or for hiding the gun rack and seriously deterring theft.

U.S. Pat. No. 5,683,021 to Settina teaches a gun case for mounting in a vehicle including a container within which the gun is substantially entirely contained and an electrically actuated locking container lid. The lock includes a plurality of latches spaced along the gun case and a common actuator plate which slides longitudinally to unlock the latches in response to an electrical actuator device such as a solenoid or an electric motor. The container pivots down to a lowered unlocked position away from the lid to enable the gun to be removed from the container and a key actuated mechanism moves the actuator plate to unlock the container when the electrical actuator does not operate.

U.S. Pat. No. 5,850,796 to Cislo teaches a gun lockbox resistant to forced entry including a guard member formed to an inside edge of a housing half, and one or more locks in an opposing housing half which engage the guard member, for securing the housing halves together and preventing insertion of a prying tool there between. The gun lockbox may also include clip members to attach the lockbox to a stationary object within a transport vehicle or to a wall, the clip members preferably consisting of complementary brackets with the attachment hardware being located inside the lockbox, to prevent easy theft of the lockbox outright.

U.S. Pat. No. 6,443,346 to Haass a gun rack for nondestructive use in any of a variety of vehicle models—generally comprises two substantially L-shaped vehicle engagement members, each having a leg portion and a foot portion, and a cross bar disposed between the upper end of the leg portions. The cross bar, or member, is dependently supported by the leg portions and comprises at least one trough adapted to support the stock portion of a gun. The gun rack is specifically adapted for repeated secure placement in, and total removal from, a vehicle without incurring damage to the vehicle during placement, use or removal.

U.S. Pat. No. 8,104,313 to Wolfe pertains to a security enclosure for a handgun includes an enclosure base having an opening to an interior portion and a cover configured to selectively cover the opening in the enclosure base. The cover may be configured in a manner to rotate from a first position in which the cover blocks access to the interior portion of the enclosure base to a second position in which the cover allows access to the interior portion of the enclosure base. A gun enclosure may be rotatably disposed within the enclosure base. The security enclosure may be configured in a manner allowing it to be securely affixed within the vehicle so that it cannot easily be removed by unauthorized persons. A biometric recognition device may be configured to operatively unlock the cover when exposed to a required feature of an authorized user.

U.S. Pat. No. 8,186,188 to Brown teaches a system for securely storing a weapon within a tray including a portable safe having an interior space sized and shaped for retaining the tray and the contained weapon. In addition, the system includes a mounting module attachable to a fixed surface including specifically motor vehicles. The mounting module includes an interior space for holding the portable safe and an access control system for locking the portable safe within the interior space of the mounting module. The access control system allows access by an authorized user and denies access of the weapon within the portable safe to an unauthorized user. The weapon is contained in the tray, the tray is retained in the portable safe and the portable safe is held in the interior space of the mounting module. Multiple mounting modules can be positioned throughout a home, office, vehicle, or wherever rapid access, convenience and weapon security are desired.

U.S. Pat. No. 8,752,745 to Bond et al. teaches a firearm case which is attachable to a motor vehicle and specifically a motorcycle. The case comprises a frame which holds and encloses a firearm. The frame includes a firearm lock and latch that securely locks the firearm in place. A housing surrounds the frame as to enclose the frame and firearm, safe from the weather, theft and minor damage. An optional remotely operated control system unlocks the firearm case and the firearm lock simultaneously for quick and easy access to the firearm.

Finally, patent publication US 2013/0284780 to Beckwith et al. relates to a multi-compartment gun case for front or rear mount on an ATV type motor vehicle. The gun case comprises an upper storage compartment suitable for storage of a rifle and a lower storage compartment suitable for storage of other equipment. The upper storage compartment opens towards the seating position of the ATV to allow for quick and easy access of a stored rifle to the driver without the need to dismount, while the lower storage compartment opens away from the driver towards an area accessible when dismounted so that a user does not need to mount the ATV to access the lower storage compartment.

It will be appreciated that the prior art lacks a suitable case for both protecting and securely transporting firearms that may be unobtrusively and temporarily or permanently attached to an interior surface of a motor vehicle while concealing both the contents of the case and the means by which the case is secured.

Most prior art gun cases are easily recognizable as gun cases and in many instances particularly lack any theft deterrent value when the cases are in plain view of an observer who may wish to steal or otherwise gain unauthorized access to the contents of the gun cases. Additionally, the prior art gun cases also lack a soft-sided protective outer cover or shell of durable material that is cut and/or tear proof and internal cable wire systems that are integral to the securing mechanism of both the contents of the case and of the case to a vehicle on to which the case is semi-permanently attached.

Presently, there is no effective way to secure firearms in the in the back of SUVs or pickup trucks. Pickup trucks, for example, lack locking trunks, and there are no means to secure cases onto the flat bed area and in SUVs there is virtually nothing to prevent a thief from simply smashing a vehicle window and grabbing a gun case which is left out in plain view. High value shotguns, rifles and other firearms require a higher level of security.

The gun safe of the present invention has the advantage over these prior patents that the gun is completely contained within an outer shell within which a gun case is locked securely to protect it from being tampered with by unauthorized personnel and to prevent it from authorized removal by intentional efforts of unauthorized persons. Another advantage is that the outer soft-sided protective container housing the gun case allows the gun safe to be displayed in such a way so as to not reveal or even indicate the contents therein.

Still another advantage of the gun safe of the present invention is that a rigid, semi rigid, or soft-sided outer shell container provides added measures against tampering with and/or removal of the contents of the safe. The gun safe of the present invention has the added advantage that it may be securely permanently or semi permanently mounted in a vehicle in a secure storage position using pre-installed and/or aftermarket cargo mounting tie downs and brackets in such a way that the securing mechanisms for the gun safe remain substantially obstructed from the plain view of an observer.

SUMMARY OF THE INVENTION

In an embodiment of the present invention, an improved, locked gun safe for mounting in a vehicle is provided which safely and unobtrusively stores a gun so that it is substantially entirely contained within the gun safe and cannot be accidentally fired, dislodged or otherwise removed from the gun case.

In an embodiment of the present invention is a gun safe including a gun case container which can be temporarily or permanently mounted within the where the container is locked to the gun safe is provided and where the container can be opened to enable the gun to be removed therefrom without dismounting the container or the gun safe from the vehicle.

In another embodiment of the present invention a gun safe with an improved locking mechanism including an outer container made of rip-proof, tear proof materials into which an inner gun case is provided and the container can simultaneously secured to a vehicle surface.

In yet another embodiment of the present invention a gun safe with an outer soft-sided protective container housing the gun case allows the gun safe container to be displayed in such a way so as to not reveal or even indicate the contents therein is provided.

In another embodiment of the present invention a gun safe is provided including a gun case container which may be securely permanently or semi permanently mounted in a vehicle using pre-installed and/or aftermarket cargo mounting tie downs and brackets in such a way that the securing mechanisms for the gun safe remain substantially obstructed from the plain view of an observer.

Finally, in an embodiment of the present invention a portable gun safe is provided which upon removal from a motor vehicle can be securely locked to other mounting devices that may be found in residences, places of businesses and hotel rooms.

BRIEF DESCRIPTION OF THE DRAWINGS

The invention is best understood from the following detailed description when read in conjunction with the accompanying drawings wherein like reference numerals refer to like parts throughout the several views and embodiments. It is emphasized that, according to common practice, the various features of the drawings are not to-scale. On the contrary, the dimensions of the various features are arbitrarily expanded or reduced for clarity. Included in the drawings are the following figures.

DETAILED DESCRIPTION OF THE DRAWINGS

Figure 1:
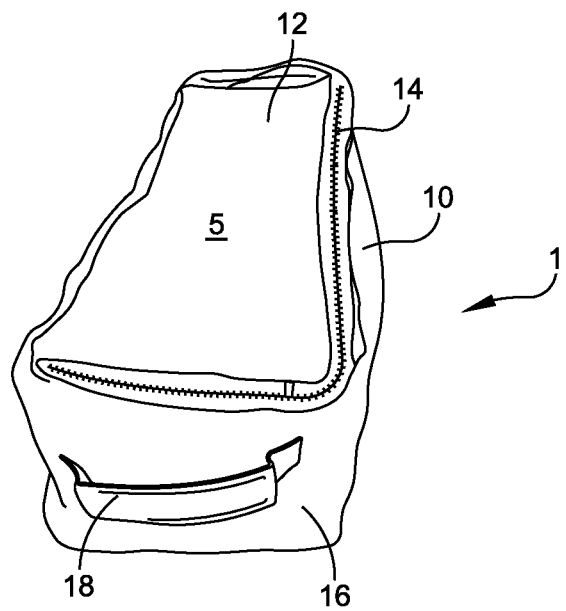
FIG. 1 is a front top-perspective view of the outer shell of the gun safe of the present invention.

The following description of the preferred embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion.

These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

Moreover, the features and benefits of the invention are illustrated by reference to exemplified embodiments and examples. Accordingly, the invention expressly should not be limited to such exemplified embodiments illustrating some possible but non-limiting combination of features that may be provided alone or in other combinations of features; the scope of the invention being defined by the claims appended hereto.

FIG. 1 shows a front top-perspective view of an embodiment of the gun safe of the present invention. Gun safe 1 consists of outer shell 5 which is generally rectangular in shape and preferably fabricated from a rip-proof, tear proof and cut-proof nylon and/or composite synthetic fabrics such as ballistic nylon and others including those sold under the brand names Kevlar®, CUT-TEX® pro, KOVENEX®, DuraFab® and other synthetic fabric materials of with similar characteristics. Ballistic nylon is particularly preferred for use in fabricating outer shell 5. As used herein ballistic refer to any nylon or composite fabric that is made with a "ballistic weave", typically a 2×2 or 2×3 basket weave. It can be woven from synthetic fiber yarns of various deniers such as 840 denier and 1680 denier, referring to the weight, not the strength, of the fabric. For example, a double weave 1050 denier fabric is the strongest and most durable fabric for its denier weight level. The 1680 denier is a good alternative that has a similar strength but lighter weight than the 1050 as it resists abrasion and tearing, ballistic nylon is also typically used for luggage and in the bottom of bags made of a lighter nylon or other fabric.

It will be appreciated that while semi-rigid and/or flexible woven fabric type materials are particularly useful in the present invention, other materials alone or in combination with semi-rigid and/or flexible fabric materials which may have greater or enhanced rigidity characteristics may be employed in the fabrication of outer shell 5. Such materials include bullet proof and bullet resistant rigid and semi rigid high density plastics, fiberglass materials, metal armor and/or combinations thereof.

Outer shell 5 includes the front wall 10, top wall 12, a pair of sidewalls 16 at either end of the front wall and a rear wall (not shown) defining a generally rectangular shape. Positioned above sidewalls 16 and front wall 10, is closure element 14 separating top wall 12 at the upper side and front wall surfaces. It will be appreciated that top wall 12 is hingedly connected to the rear wall of outer shell 5 due to the construction of the outer shell but in some embodiments, top wall 12 may be entirely removable. Closure element 14 may be a heavy duty zipper formed of nylon, brass and other metal alloys which are resistant to tampering and/or forcible entry by cutting or prying. Closure element 14 may also be provided with an external lock for securing the zipper to one end of outer shell 5. Other closure devices such as Velcro® hook and loop fasteners and locking snap-fit, twist or turn and lock and tuck and push lock type devices, which are adapted for keyed entry may also be used. Carrying handle 18 which can be present on either or both sidewalls 16 may also optionally be included. Carrying handle 18 not only provides a means to grip and carry the outer shell but also lends an innocuous "duffel bag" type of appearance to gun safe 1. It will also be appreciated that the fabric material forming outer shell 5 can be collapsed and stored essentially flat or crushed in its unused state.

Figure 2:
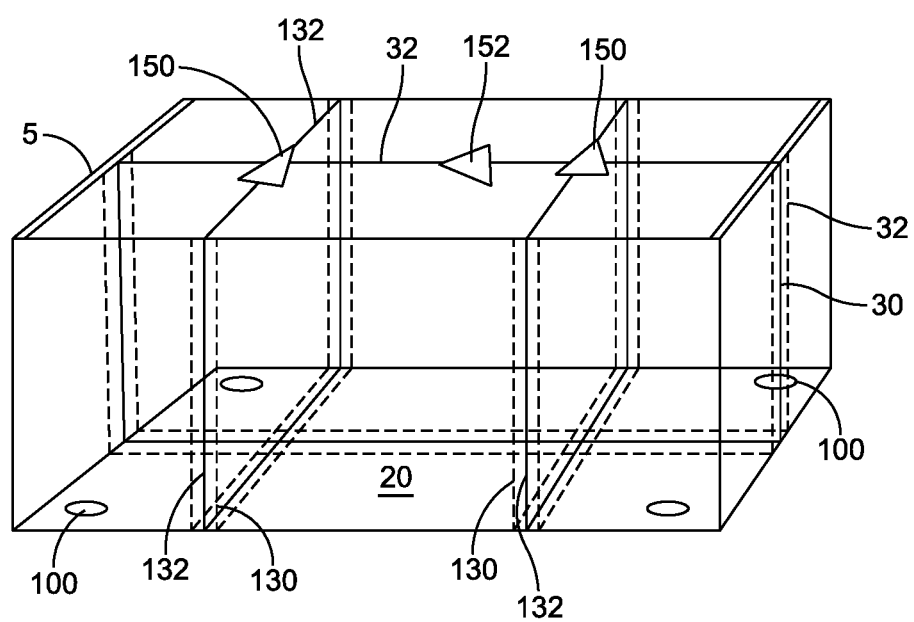
FIG. 2 is a partial phantom view of the interior surface of the outer shell shown in FIG. 1.

In FIG. 2 there is shown partial phantom view of the interior surface of the outer shell 5 shown in FIG. 1. Corresponding generally to the inner surfaces of front wall 10, the rear wall and outer shell base 20 are latitudinal cable conduits 132 which are sewn into a fabric material lining outer shell 5. Latitudinal cable conduits 132 define a path through which latitudinal cable 130 of predefined length may traverse with the respective ends of latitudinal cable 130 overlapping and meeting in adjustable latitudinal lock 150. It will be appreciated that in the embodiment shown, at least one or more latitudinal cables 130 may be utilized in outer shell 5. Corresponding generally to the inner surfaces of sidewalls 16 and outer shell base 20 are longitudinal cable conduits 32 which are likewise sewn into the fabric material lining outer shell 5. Suitable fabrics materials for lining outer shell 5 include acrylics and acrylic blends.

Longitudinal cable conduits 32 define a path through which longitudinal cable 30 of predefined length may traverse with the respective ends of longitudinal cable 30 overlapping and meeting in adjustable longitudinal lock 152. Longitudinal cable 30 may also be threaded underneath latitudinal cable 130 or vice versa. It will likewise be appreciated at least one or more longitudinal cables 30 may also be utilized in outer shell 5. Preferably two adjustable latitudinal cables 132 run from the top of the outer shell around the walls of the unit and back up to the top of the interior surface via adjustable latitudinal lock 150. A longitudinal cable 30 is run from the top of the inner surface lengthways around the outer shell and locked on top via adjustable longitudinal lock 152. It will be understood that that longitudinal and latitudinal cables 30 and 130 are hidden from view and are protected in their respective cable conduits.

Longitudinal and latitudinal cables 30 and 130 respectively, are formed of high strength stainless steel cable which is both relatively thin and flexible and also has a high breaking strength. It may be uncoated or coated. Some preferred stainless steel cable types are those designed primarily for use in rigging, the aircraft industry and in military applications ranging in size to up to ⅜ inch or approximately 10 mm. Stainless steel cable is especially desirable because it is durable and not easily cut without the aid of specialized tools. Additionally, typically specified by the number of strands in the rope, times the number of wires in each strand. For example, the notation 7×19 means that the rope has seven (7) strands and there are nineteen (19) wires in each strand. The break strength of the stainless steel preferably exceeds 250 lbs. The overlapping longitudinal and latitudinal cables 30 and 130 effectively form a flexible inner cage that is capable of surrounding a consumer's existing gun case (or gun cases) and in connection with longitudinal and latitudinal adjustable cable locks 150 and 152 can tightly lock around the gun cases thereby providing a very high level of deterrence against theft. In use, longitudinal and latitudinal adjustable cable locks 150 and 152 are synched down tightly around the gun cases and then locked from the top as is shown more clearly in FIG. 5.

Figure 3:
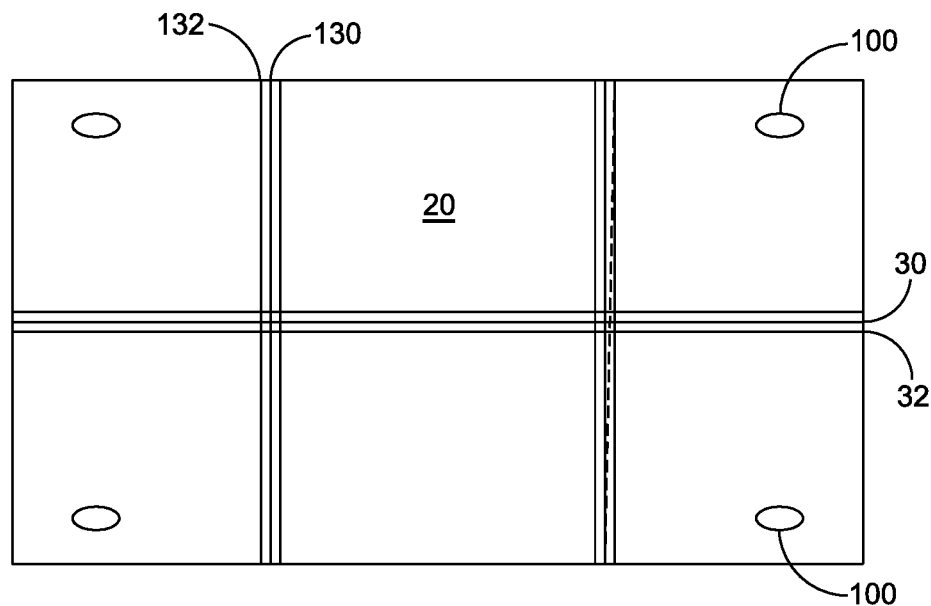
FIG. 3 is a top down view of an interior base of the outer shell shown in FIG. 2.
Figure 4:
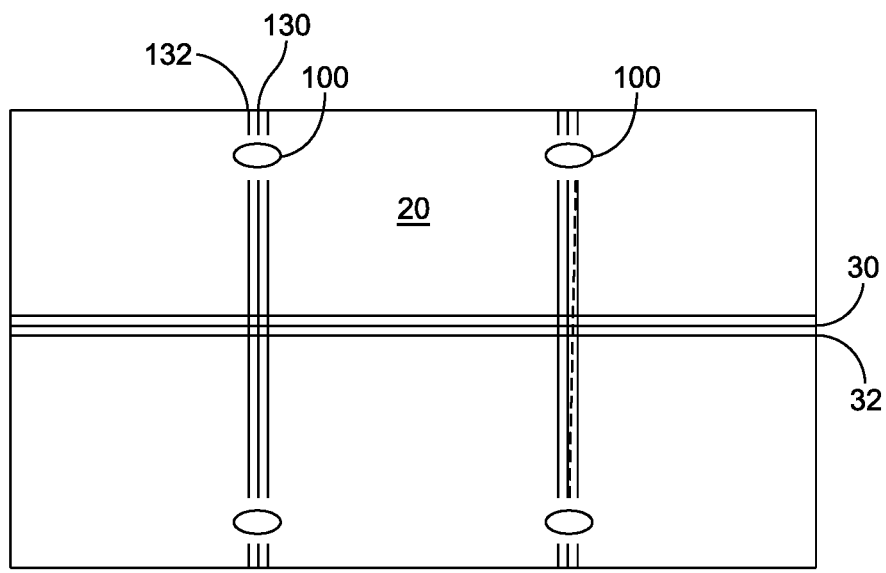
FIG. 4 is a top down view of an alternative embodiment of interior base of the outer shell shown in FIG. 2.

FIG. 3 and FIG. 4, show two alternative top down views of an interior base of the outer shell shown in FIG. 2. As can be seen, longitudinal and latitudinal cable conduits 32 and 132 define a path through which longitudinal and latitudinal cable 30 and 130 traverse outer shell base 20. Within outer shell base 20 are a plurality of cable voids or openings 100 which allow for internally securing outer shell 5 via a securing member (not shown) to a cargo tie or other securing device which is permanently affixed to a motor vehicle. It will be understood that the type of securing member can include a separate length of stainless steel cable of the type used for longitudinal and latitudinal cables 30 and 130 and may also include (as may be seen with respect to FIG. 4) a portion of longitudinal and latitudinal cables 30 and 130 which can be treaded into and through a cargo tie. When the securing member or longitudinal and latitudinal cables 30 and 130 are in operative contact with the cargo tie or other securing device permanently affixed to the motor vehicle (collectively, vehicle mounting systems), the tightening of the longitudinal and latitudinal adjustable cable locks 150 and 152 will cause outer shell 5 to slightly deflect its shape and in so doing, substantially cover the cargo tie down so as to make both the cargo tie down and the securing points below outer shell 5 unobservable to the ordinary viewer. Cable voids 100 may further be reinforced with metal alloy grommets to enhance the secure attachment of outer shell 5 to the vehicle mounting system.

Figure 5:
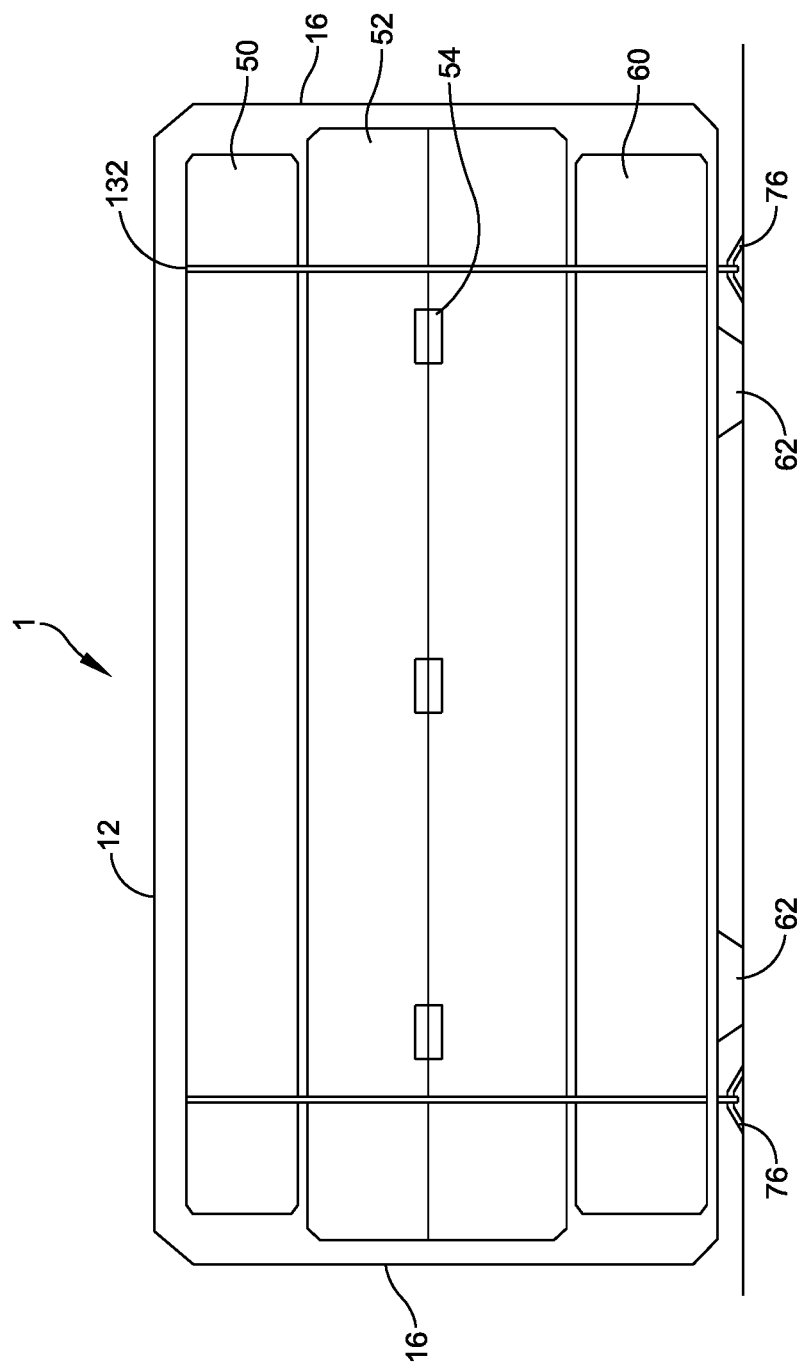
FIG. 5 is a cross sectional view of an embodiment of the gun safe of the present invention.

FIG. 5 shows a cross sectional length-wise view of an embodiment of the gun case 1 of the present invention. Positioned within outer shell 5, and bounded by top surface 12 sidewalls 16 and outer shell base 20, is gun case 52. Gun case 52 typically measures approximately 40"×11"×5" and is of the "break-down" type that may be purchased from a specialty firearms dealer or may come from the manufacturer of a high-end shotgun or rifle. Approximately midline in gun case 52 is gun case hinge element 54 which typically allows gun case 52 to be opened 180 degrees to an essentially flat, planar position to permit access to the firearm being housed and transported and the other contents of the case. It will be appreciated that outer shell 5 is of appropriate dimensions to accommodate a gun case or gun cases of a variety of sizes.

Figure 7:
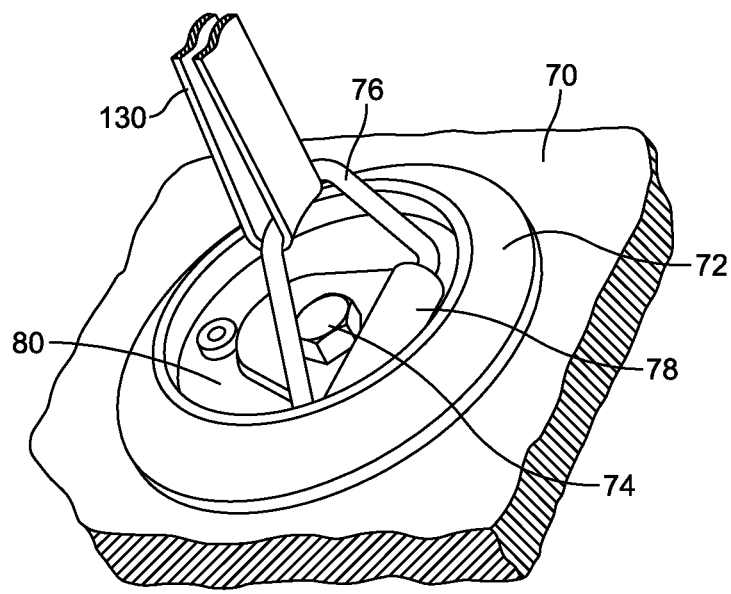
FIG. 7 is a perspective view of the cargo tie of the type shown in FIG. 6.
Figure 8:
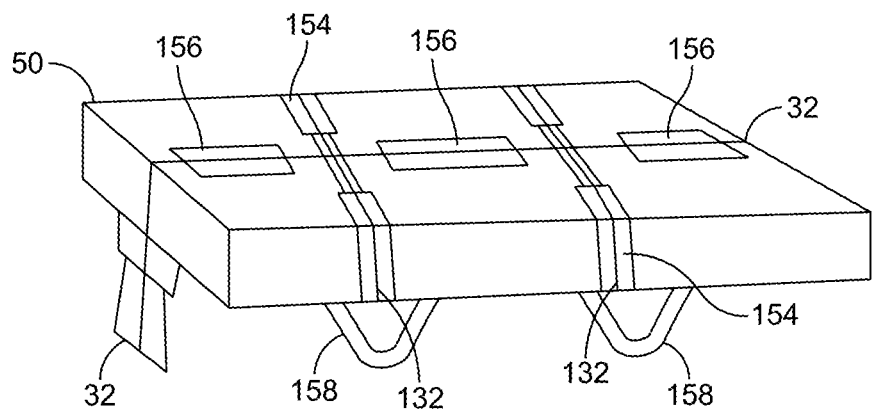
FIG. 8 is a side perspective drawing of an upper securing plate of the gun safe of the present invention.

Placed above gun case 52 is security plate 50 (shown more clearly in FIG. 8). Security plate 50 includes recesses and channels within its upper and side surfaces to receive longitudinal and latitudinal cables 30 and 130 and longitudinal and latitudinal adjustable cable locks 150 and 152. The recesses and channels provide spaces into which the cables and locks may be seated below the upper surface of security plate 50 thereby making tampering and or cutting of the cables extremely difficult. Security plate 50 may be fabricated of high density plastic polymer materials capable of withstanding high temperatures and impact damage. Suitable materials for fabricating security plate 50 include polyethylene, polypropylenes, polycarbonates and nylons as well as combinations of the foregoing. Below gun case 52 is optional security base 60 which can provide for additional storage for accessories including ammunition and gun cleaning supplies. Alternatively, optional security base 60 can be replaced by one or more additional gun cases. On the lower surface of outer shell 5 are support legs 62 for resting the gun case of the present invention on a cargo storage support surface, typically a SUV cargo area or a pickup truck bed. In the embodiment shown, latitudinal cable 132 is shown engaged with cleat 76 of cargo tie down discussed more thoroughly in FIGS. 6 and 7. It will however be understood that cleat 76 can also engage a separate cable segment which may in turn traverse cable voids 100 in outer shell base 20.

Figure 6:
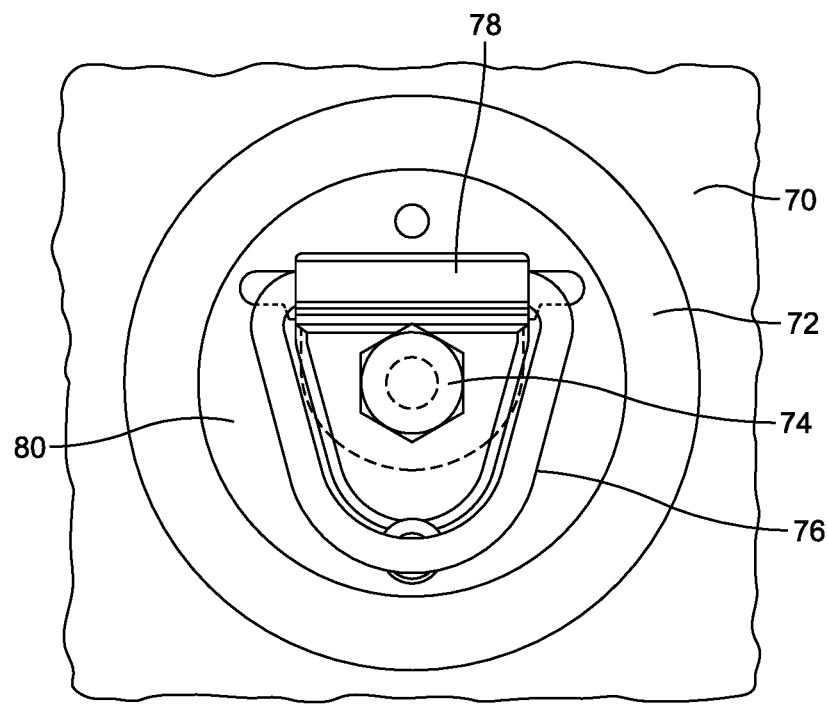
FIG. 6 is a top down view of a cargo tie down of the type used to secure the gun safe of the present invention to a motor vehicle.

FIG. 6 and FIG. 7 show one example of a prior art cargo tie down of the type useful in securing the gun safe of the present invention to a motor vehicle. Cargo tie down 70 is positioned within a planar surface, typically the trunk section or cargo area of a motor vehicle. Cargo tie down 70 includes annular support ring 72, anchor bolt 74, cleat 76, hinge 78 and recessed base 80. It will be understood that recessed base 80 may typically be at or lower than the surface onto which cargo tie down 70 is mounted. Annular support ring 72 is of sufficient depth so that cleat 76 and hinge 78 are generally positioned below the upper surface of annular ring 72. Anchor bolt 74 is preferably attached directly to cross member of a vehicle chassis or to a mounting plate attached to the vehicle chassis so that cargo tie down 70 is securely and permanently affixed to the vehicle. In FIG. 7 there is shown the cargo tie down of FIG. 6 engaged at cleat 76 with a segment of latitudinal cable 130. It will likewise be appreciated that cleat 76 may also be engaged with a segment of longitudinal cable 30 or a separate cable segment which may traverse cable voids 100.

It will also be appreciated that the gun safe of the present invention may, upon removal from a motor vehicle, be mounted securely to similar types of tie downs and other securing devices that may be found in residences, places of business and hotel rooms. In this regard, the gun safe of the present invention is portable and the attendant advantages of using, transporting and storing firearms safely and securely in the tamper resistant outer shell is not limited to use in motor vehicles.

FIG. 8. shows a side perspective drawing of securing plate 50 of the gun safe of the present invention. Securing plate 50 is of similar dimensions and is sized so as to fit completely within outer shell 5. Security plate 50 includes channels 154 and recesses 156 within its upper and side surfaces to receive longitudinal and latitudinal cables 30 and 130 and longitudinal and latitudinal adjustable cable locks 150 and 152 respectively. Recesses 156 and channels 154 provide indentations and cut-outs into which the cables and locks may be seated below the upper surface of security plate 50. By placing the cables and locks below the upper surface of security plate 50 access to the cables and locks and possible cutting of the cables or attempted picking of the locks becomes extremely difficult. Additionally, by recessing the cables and locks, the upper surface of security plate 50 becomes essentially planar providing a more pleasing aesthetic appearance. Below and depending downwardly from security plate 50 are cable loops 158. Cable loops 158 can receive a separate cable segment which may in turn traverse cable voids 100 in outer shell base 20

Figure 9:
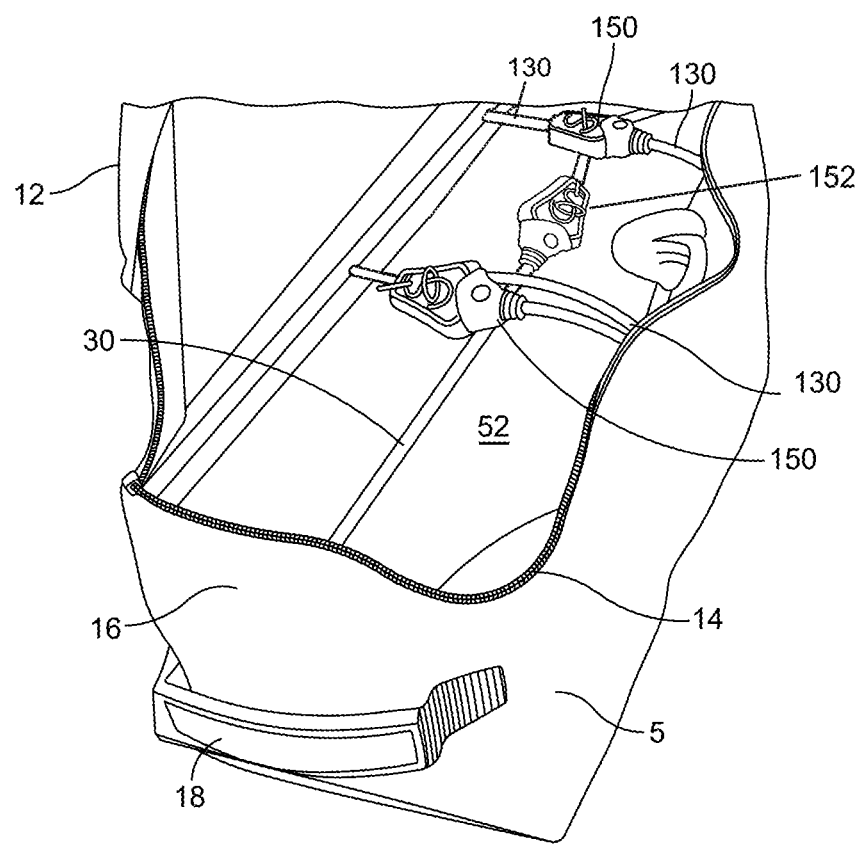
FIG. 9 is a partial front top perspective view of the gun safe of the present invention showing the cable in place.

FIG. 9 shows a partial front top perspective view of the gun safe of the present invention showing longitudinal and latitudinal cables 30 and 130 and longitudinal and latitudinal adjustable cable locks 150 and 152 in place. Top wall 12 of outer shell 5 defining a generally rectangular shape is shown open to reveal the contents therein. Closure element 14 separating top wall 12 at the upper side and front wall surfaces is shown in the open state. Closure element 14 may be a heavy duty zipper formed of brass and other metal alloys which are resistant to tampering and/or forcible entry by cutting or prying. Closure element 14 may also be provided with an external lock for securing the zipper to one end of outer shell 5. At sidewall 16 carrying handle 18 is present to provide a means to grip and carry the outer shell but also lends an innocuous "duffel bag" type of appearance to gun safe 1. Within outer shell 5 are shown gun case 50 secured in place by longitudinal and latitudinal cables 30 and 130 and longitudinal and latitudinal adjustable cable locks 150 and 152 respectively.

As may be understood, gun case 50 is held securely and tightly in place by the flexible cage that is formed by longitudinal and latitudinal cables 30 and 130 and longitudinal and latitudinal adjustable cable locks 150 and 152. By tightly securing and locking the cables in place over the contents of gun safe 1, outer shell 5 substantially conforms to the shape of the gun case (or cases) contents stored within thereby making access to the gun case largely tamper proof.

Figure 10:
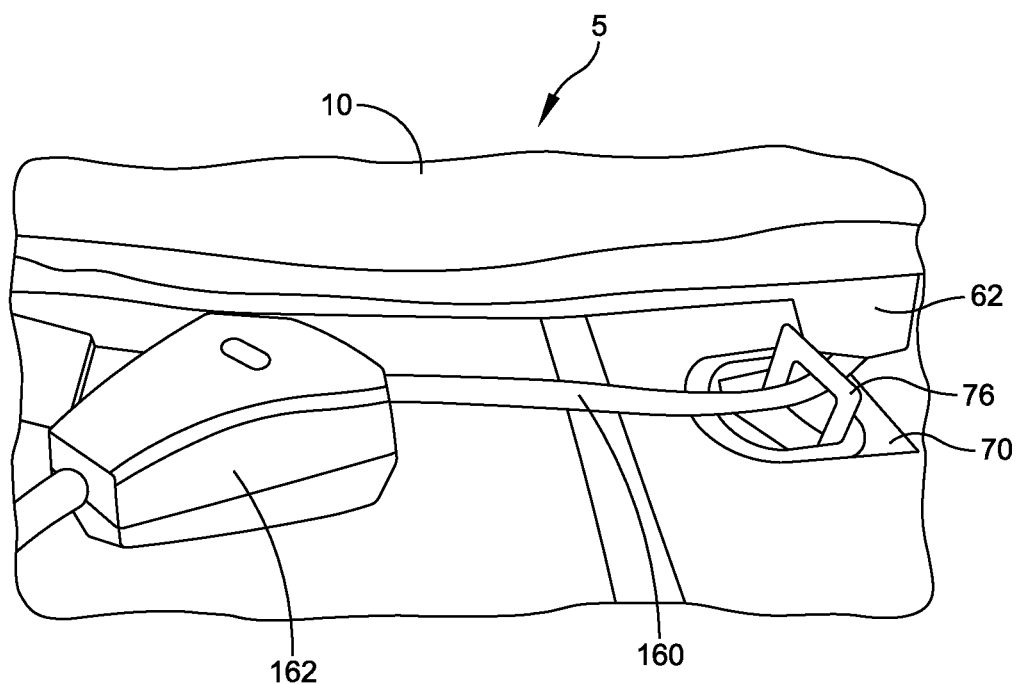
FIG. 10 is side perspective view of the cable securing mechanism used in the gun safe of the present invention shown in operative contact with a cargo tie down.

In FIG. 10 there is a side perspective view of the cable securing mechanism used in the present invention shown in operative contact with cleat 76 of cargo tie down 70. Cable segment 160 is shown engaged with and running through cleat 76 with adjustable cable lock 162 and in turn through cable voids 100 in outer shell base 20. Cable segment 160 is of sufficient length that it may be threaded through two or more cargo tie downs and when cable segment 160 or longitudinal and latitudinal cables 30 and 130 are in operative contact with the cargo tie or other securing device permanently affixed to the motor vehicle (collectively, vehicle mounting systems), the tightening of the longitudinal and latitudinal adjustable cable locks 150 and 152 or adjustable cable lock 162 will cause outer shell 5 to slightly deflect its shape and in so doing, substantially cover the cargo tie down so as to make both the cargo tie down and the securing points below outer shell 5 unobservable to the ordinary viewer.

While the foregoing description and drawings represent the exemplary embodiments of the present invention, it will be understood that various additions, modifications and substitutions may be made therein without departing from the spirit and scope of the present invention as defined in the accompanying claims. In particular, it will be clear to those skilled in the art that the present invention may be embodied in other specific forms, structures, arrangements, proportions, sizes, and with other elements, materials, and components, without departing from the spirit or essential characteristics thereof. One skilled in the art will appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

What I claim is:

1. A gun storage safe comprising:
   a flexible generally rectangular closeable outer shell having a top, a bottom, a pair of sidewalls, a front and a rear and wherein said outer shell further comprises a plurality of cable conduit channels positioned on said bottom, sidewalls, front and rear;
   at least one wire cable of a predefined length substantially disposed within said cable conduit channel wherein said cable traverses the bottom of said outer shell and at least one of said sidewalls or said front and rear and further wherein said wire cable ends extend beyond said cable conduit channels;
   at least one adjustable cable lock in operative contact with said at least one wire cable end;
   at least one gun case;
   wherein the at least one wire cable positioned within said wire conduit channel is drawn down upon and tightened on said gun case and said at least one adjustable cable lock engages the opposite end of said at least one wire cable end to securely lock at least one wire cable in place.

2. The gun storage safe of claim 1 further comprising a security plate positioned above the at least said gun case.

3. The gun storage safe of claim 1 further comprising a plurality of gun cases.

4. The gun storage safe of claim 1 further comprising a plurality of wire cables of predefined length and a plurality of adjustable cable locks engaging the ends of said wire cables.

5. The gun storage safe of claim 1 wherein said bottom comprises a plurality of voids and further comprises a cable segment and adjustable lock for securing said safe to a cargo tie down.

6. The gun storage safe of claim 2 further comprising a bottom plate.

7. The gun storage case of claim 3 further comprising a bottom plate.

8. The gun storage safe of claim 1 wherein said outer shell is comprised of a fabric selected from the group consisting of ballistic nylon, Kevlar®, CUT-TEX® pro, KOVENEX®, DuraFab® and combinations thereof.

9. The gun storage safe of claim 1 further comprising a closure element.

10. The gun storage safe of claim 9 wherein the closure element is selected from the group consisting of zippers, hook and loop fasteners, locking snap-fits, twist and locks, and tuck locks and combinations thereof.

11. A gun storage safe comprising:
a flexible generally rectangular closeable outer shell having a top, a bottom, a pair of sidewalls, a front and a rear and wherein said outer shell further comprises at least one longitudinal cable conduit channel positioned on said bottom and said front and rear and at least one latitudinal cable conduit channels position on said bottom and said sidewalls;
a plurality of wire cables of predefined length substantially disposed within said cable conduit channels wherein said longitudinal cable traverses the bottom of said outer shell and said front and rear, said latitudinal cable traverses the bottom of said outer shell and said sidewalls or further wherein said wire cable ends extend beyond said cable conduit channels;
at least one adjustable cable lock in operative contact with each wire cable ends;
at least one gun case;
a security plate;
wherein the wire cables positioned within said wire conduit channels are drawn down upon and tightened on said gun case and said each adjustable cable lock engages the opposite end of said wire cables end to securely lock at least one wire cable in place.

12. The gun storage safe of claim 11 wherein said bottom comprises a plurality of voids and further comprises a cable segment and adjustable lock for securing said safe to a cargo tie down.

13. The gun storage safe of claim 11 further comprising a closure element.

14. The gun storage safe of claim 12 wherein the closure element is selected from the group consisting of zippers, hook and loop fasteners, locking snap-fits, twist and locks, and tuck locks and combinations thereof.

15. A gun storage safe comprising:
a generally rectangular closeable outer shell having a top, a bottom, a pair of sidewalls, a front and a rear and wherein said outer shell further comprises a plurality of cable conduit channels positioned on said bottom, sidewalls, front and rear;
at least one wire cable of a predefined length substantially disposed within said cable conduit channel wherein said cable traverses the bottom of said outer shell and at least one of said sidewalls or said front and rear and further wherein said wire cable ends extend beyond said cable conduit channels;
at least one adjustable cable lock in operative contact with said at least one wire cable end;
at least one gun case;
wherein the at least one wire cable positioned within said wire conduit channel is drawn down upon and tightened on said gun case and said at least one adjustable cable lock engages the opposite end of said at least one wire cable end to securely lock at least one wire cable in place.

16. The gun storage safe of claim 15 wherein said outer shell is comprised of bullet proof and bullet resistant rigid and semi rigid high density plastics, fiberglass materials, metal armor and/or combinations thereof.

17. The gun storage safe of claim 15 comprising a plurality of wire cables of predefined length and a plurality of adjustable cable locks engaging the ends of said wire cables.

18. The gun storage safe of claim 15 wherein said bottom comprises a plurality of voids and further comprises a cable segment and adjustable lock for securing said safe to a cargo tie down.

* * * * *

UNITED STATES PATENT AND TRADEMARK OFFICE
CERTIFICATE OF CORRECTION

PATENT NO. : 9,625,234 B2  
APPLICATION NO. : 15/092288  
DATED : April 18, 2017  
INVENTOR(S) : Brian D. Booth It is certified that error appears in the above-identified patent and that said Letters Patent is hereby corrected as shown below:

On the Title Page

Item (54) and in the Specification, Column 1, Lines 1-2, please delete:
"VEHICLE GUN STORAGE SAFE WITH FLEXIBLE INTERNAL LOCKING CASE"

And insert:
-- VEHICLE GUN STORAGE SAFE WITH FLEXIBLE INTERNAL LOCKING CAGE --

Signed and Sealed this
Twentieth Day of June, 2017

Joseph Matal
*Performing the Functions and Duties of the*
*Under Secretary of Commerce for Intellectual Property and*
*Director of the United States Patent and Trademark Office*